US008631203B2

(12) United States Patent
Fortin et al.

(10) Patent No.: US 8,631,203 B2
(45) Date of Patent: Jan. 14, 2014

(54) MANAGEMENT OF EXTERNAL MEMORY FUNCTIONING AS VIRTUAL CACHE

(75) Inventors: Michael Fortin, Redmond, WA (US); Cenk Ergan, Bellevue, WA (US); Mehmet Iyigun, Bellevue, WA (US); Yevgeniy Bak, Redmond, WA (US); Ben Mickle, Bellevue, WA (US); Aaron Dietrich, Bothell, WA (US); Alexander Kirshenbaum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 11/953,312

(22) Filed: Dec. 10, 2007

(65) Prior Publication Data
US 2009/0150611 A1    Jun. 11, 2009

(51) Int. Cl.
*G06F 12/08* (2006.01)
*G06F 12/00* (2006.01)

(52) U.S. Cl.
USPC ..... 711/118; 711/115; 711/209; 711/E12.017

(58) Field of Classification Search
None
See application file for complete search history.

(56) References Cited

U.S. PATENT DOCUMENTS

| | | |
|---|---|---|
| 4,476,526 A | 10/1984 | Dodd |
| 4,612,612 A | 9/1986 | Woffinden et al. |
| 4,945,474 A | 7/1990 | Elliott |
| 4,972,316 A | 11/1990 | Dixon |
| 4,979,108 A | 12/1990 | Crabbe |
| 5,088,026 A | 2/1992 | Bozman et al. |
| 5,175,834 A | 12/1992 | Sawai |
| 5,263,136 A | 11/1993 | DeAguiar |
| 5,297,258 A | 3/1994 | Hale |
| 5,307,497 A | 4/1994 | Feigenbaum |
| 5,394,531 A | 2/1995 | Smith |
| 5,398,325 A | 3/1995 | Chang et al. |
| 5,420,998 A | 5/1995 | Horning |
| 5,454,098 A | 9/1995 | Pisello |

(Continued)

FOREIGN PATENT DOCUMENTS

| | | |
|---|---|---|
| CN | 1266229 | 9/2000 |
| CN | 1465009 | 12/2003 |

(Continued)

OTHER PUBLICATIONS

Archer, Tom, "ReadyBoost—Using Your USB Key to Speed Up Windows Vista," Apr. 2006, http://blogs.msdn.com/b/tomarcher/archive/2006/04/14/576548.aspx.*

(Continued)

*Primary Examiner* — Michael Krofcheck
(74) *Attorney, Agent, or Firm* — L. Alan Collins; Collins & Collins Intellectual, LLC (57) ABSTRACT

A method and apparatus for managing the caching of data on an auxiliary memory of a computer. Pages of data may be cached on an auxiliary memory, such as a flash memory, at a virtual level using an identifier that does not involve a physical address of the pages on a memory. Pages may be cached on auxiliary memory that may be removable from the computer, e.g., by unplugging the memory from the computer. Page data may be encrypted and/or compressed on the auxiliary memory. An authentication indicator may be used to verify the accuracy of cached data in the case of an interrupted connection to the auxiliary memory, e.g., as a result of computer power down, hibernation, removal of the memory from the computer, etc.

20 Claims, 2 Drawing Sheets

(56) References Cited

U.S. PATENT DOCUMENTS

| | | |
|---|---|---|
| 5,463,739 A | 10/1995 | Albaugh |
| 5,524,230 A | 6/1996 | Sakaue |
| 5,551,002 A | 8/1996 | Rosich |
| 5,557,770 A | 9/1996 | Bhide |
| 5,561,783 A | 10/1996 | Vanka |
| 5,572,660 A | 11/1996 | Jones |
| 5,574,877 A * | 11/1996 | Dixit et al. .................... 711/207 |
| 5,603,001 A | 2/1997 | Sukegawa |
| 5,611,067 A | 3/1997 | Okamoto |
| 5,652,857 A | 7/1997 | Shimoi |
| 5,666,532 A | 9/1997 | Saks |
| 5,717,954 A | 2/1998 | Grieff |
| 5,720,029 A | 2/1998 | Kern |
| 5,740,434 A | 4/1998 | Eastep |
| 5,751,932 A | 5/1998 | Horst |
| 5,754,782 A | 5/1998 | Masada |
| 5,754,888 A | 5/1998 | Yang |
| 5,764,877 A | 6/1998 | Lomet |
| 5,806,074 A | 9/1998 | Souder |
| 5,809,280 A | 9/1998 | Chard |
| 5,809,543 A | 9/1998 | Byers et al. |
| 5,832,515 A | 11/1998 | Ledain |
| 5,845,293 A * | 12/1998 | Veghte et al. ......... 707/E17.007 |
| 5,875,466 A | 2/1999 | Wakerly |
| 5,897,638 A | 4/1999 | Lasser |
| 5,897,660 A | 4/1999 | Reinders |
| 5,900,022 A | 5/1999 | Kranich |
| 5,900,870 A | 5/1999 | Malone |
| 5,923,838 A | 7/1999 | Hongo |
| 5,943,692 A | 8/1999 | Marberg |
| 5,996,054 A | 11/1999 | Ledain |
| 6,000,006 A | 12/1999 | Bruce |
| 6,018,433 A | 1/2000 | Thayne |
| 6,018,746 A | 1/2000 | Hill |
| 6,026,027 A | 2/2000 | Terrell |
| 6,047,291 A | 4/2000 | Anderson |
| 6,073,232 A | 6/2000 | Kroeker |
| 6,092,160 A | 7/2000 | Marsters |
| 6,098,075 A | 8/2000 | Becraft |
| 6,101,601 A | 8/2000 | Matthews |
| 6,108,004 A | 8/2000 | Medl |
| 6,112,024 A | 8/2000 | Almond |
| 6,122,685 A | 9/2000 | Bachmat |
| 6,128,627 A | 10/2000 | Mattis |
| 6,138,125 A | 10/2000 | DeMoss |
| 6,148,368 A | 11/2000 | DeKoning |
| 6,185,629 B1 | 2/2001 | Simpson |
| 6,189,071 B1 | 2/2001 | Bachmat |
| 6,199,195 B1 | 3/2001 | Goodwin |
| 6,209,088 B1 | 3/2001 | Reneris |
| 6,230,233 B1 | 5/2001 | Lofgren |
| 6,237,065 B1 | 5/2001 | Banerjia |
| 6,240,414 B1 | 5/2001 | Beizer |
| 6,247,026 B1 | 6/2001 | Waldo |
| 6,249,841 B1 | 6/2001 | Sikes |
| 6,272,534 B1 | 8/2001 | Guha |
| 6,275,436 B1 | 8/2001 | Tobita |
| 6,298,428 B1 * | 10/2001 | Munroe et al. ................ 711/202 |
| 6,301,635 B2 | 10/2001 | Bothwell |
| 6,311,232 B1 | 10/2001 | Cagle |
| 6,314,433 B1 | 11/2001 | Mills |
| 6,317,806 B1 | 11/2001 | Audityan |
| 6,321,234 B1 | 11/2001 | Debrunner |
| 6,338,056 B1 | 1/2002 | Dessloch |
| 6,338,126 B1 | 1/2002 | Ohran |
| 6,345,000 B1 | 2/2002 | Wong |
| 6,360,330 B1 | 3/2002 | Mutalik |
| 6,366,996 B1 | 4/2002 | Hobson |
| 6,370,534 B1 | 4/2002 | Odom |
| 6,370,541 B1 | 4/2002 | Chou |
| 6,378,043 B1 | 4/2002 | Girkar |
| 6,401,093 B1 | 6/2002 | Anand |
| 6,408,058 B1 | 6/2002 | Lanet |
| 6,418,510 B1 | 7/2002 | Lamberts |
| 6,425,057 B1 | 7/2002 | Cherkasova |
| 6,434,682 B1 | 8/2002 | Ashton |
| 6,438,750 B1 | 8/2002 | Anderson |
| 6,454,159 B1 | 9/2002 | Takushima |
| 6,477,564 B1 | 11/2002 | Freyssinet |
| 6,505,205 B1 | 1/2003 | Kothuri |
| 6,513,051 B1 | 1/2003 | Bolosky |
| 6,516,380 B2 | 2/2003 | Kenchammana-Hoskote |
| 6,519,597 B1 | 2/2003 | Cheng |
| 6,535,949 B1 | 3/2003 | Parker |
| 6,539,456 B2 | 3/2003 | Stewart |
| 6,542,904 B2 | 4/2003 | Crus |
| 6,556,983 B1 | 4/2003 | Altschuler |
| 6,557,077 B1 | 4/2003 | Ghosh |
| 6,560,702 B1 | 5/2003 | Gharda |
| 6,567,889 B1 | 5/2003 | DeKoning |
| 6,578,046 B2 | 6/2003 | Chang |
| 6,615,313 B2 | 9/2003 | Kato |
| 6,629,201 B2 | 9/2003 | Dempsey |
| 6,636,942 B2 | 10/2003 | Greco |
| 6,640,278 B1 | 10/2003 | Nolan |
| 6,647,472 B2 | 11/2003 | Atkinson |
| 6,651,141 B2 | 11/2003 | Adrangi |
| 6,671,699 B1 | 12/2003 | Black |
| 6,671,757 B1 | 12/2003 | Muller |
| 6,684,229 B1 | 1/2004 | Luong |
| 6,687,158 B2 | 2/2004 | Yano |
| 6,694,336 B1 | 2/2004 | Multer |
| 6,714,935 B1 | 3/2004 | Delo |
| 6,718,361 B1 | 4/2004 | Basani |
| 6,721,863 B1 | 4/2004 | Endo |
| 6,738,789 B2 | 5/2004 | Multer |
| 6,742,097 B2 | 5/2004 | Woo |
| 6,751,658 B1 | 6/2004 | Haun |
| 6,757,696 B2 | 6/2004 | Multer |
| 6,760,736 B2 | 7/2004 | Waldo |
| 6,769,050 B1 | 7/2004 | Ware |
| 6,771,536 B2 | 8/2004 | Li |
| 6,772,178 B2 | 8/2004 | Mandal |
| 6,782,453 B2 | 8/2004 | Keltcher |
| 6,788,612 B2 | 9/2004 | Hsu |
| 6,871,271 B2 | 3/2005 | Ohran |
| 6,877,081 B2 | 4/2005 | Herger |
| 6,879,266 B1 | 4/2005 | Dye |
| 6,901,499 B2 | 5/2005 | Aasheim |
| 6,910,106 B2 * | 6/2005 | Sechrest et al. ................ 711/136 |
| 6,918,022 B2 | 7/2005 | Li |
| 6,928,521 B1 | 8/2005 | Burton |
| 6,930,919 B2 | 8/2005 | Lee |
| 6,938,116 B2 | 8/2005 | Kim |
| 6,941,423 B2 | 9/2005 | Coulson |
| 6,959,318 B1 | 10/2005 | Tso |
| 6,996,660 B1 | 2/2006 | Moore |
| 7,007,072 B1 | 2/2006 | Guha |
| 7,010,645 B2 | 3/2006 | Hetzler |
| 7,017,037 B2 | 3/2006 | Fortin |
| 7,036,040 B2 | 4/2006 | Nicholson |
| 7,039,765 B1 | 5/2006 | Wilkes |
| 7,043,610 B2 | 5/2006 | Horn et al. |
| 7,057,942 B2 | 6/2006 | Suda |
| 7,062,675 B1 | 6/2006 | Kemeny |
| 7,065,627 B2 | 6/2006 | Dayan |
| 7,068,575 B2 | 6/2006 | Gabryjelski |
| 7,082,495 B2 | 7/2006 | DeWhitt |
| 7,082,499 B2 | 7/2006 | Kamitani et al. |
| 7,143,120 B2 | 11/2006 | Oks |
| 7,171,532 B2 | 1/2007 | Kodama |
| 7,185,155 B2 | 2/2007 | Sechrest |
| 7,231,497 B2 | 6/2007 | Trika |
| 7,284,149 B1 * | 10/2007 | Fisher et al. ................... 711/115 |
| 7,366,740 B2 | 4/2008 | Sleeman |
| 7,366,866 B2 | 4/2008 | Cochran |
| 7,380,090 B2 | 5/2008 | Koseki |
| 7,395,401 B2 | 7/2008 | Sanders |
| 7,409,537 B2 | 8/2008 | Tsang |
| 7,412,369 B1 | 8/2008 | Gupta |
| 7,412,562 B2 | 8/2008 | Garney |
| 7,451,353 B2 | 11/2008 | Grimsrud |
| 7,490,197 B2 | 2/2009 | Kirshenbaum |
| 7,631,140 B2 | 12/2009 | Saito |

(56) References Cited

U.S. PATENT DOCUMENTS

| | | |
|---|---|---|
| 7,644,239 B2 | 1/2010 | Ergan |
| 7,698,513 B2 | 4/2010 | Sechrest |
| 7,774,508 B2 | 8/2010 | Nakamura |
| 7,805,571 B2 | 9/2010 | Kirshenbaum |
| 7,814,261 B2 | 10/2010 | Lee |
| 7,818,701 B1* | 10/2010 | Kolokowsky ................ 711/173 |
| 7,945,734 B2 | 5/2011 | Lahcanski |
| 7,953,774 B2 | 5/2011 | Cong |
| 8,006,037 B2 | 8/2011 | Kirshenbaum |
| 8,032,707 B2 | 10/2011 | Iyigun |
| 8,032,723 B2 | 10/2011 | Sechrest |
| 8,108,450 B2 | 1/2012 | Cong |
| 8,135,914 B2 | 3/2012 | Iyigun |
| 8,255,645 B2 | 8/2012 | Ergan |
| 2001/0007123 A1 | 7/2001 | Seguchi |
| 2001/0007999 A1 | 7/2001 | Rasmussen |
| 2001/0047462 A1 | 11/2001 | Dimitroff |
| 2002/0004876 A1 | 1/2002 | Timmer |
| 2002/0073276 A1 | 6/2002 | Howard |
| 2002/0083275 A1 | 6/2002 | Kawamoto |
| 2002/0087797 A1 | 7/2002 | Adrangi |
| 2002/0091702 A1 | 7/2002 | Mullins |
| 2002/0108017 A1 | 8/2002 | Kenchammana-Hoskote |
| 2002/0143521 A1 | 10/2002 | Call |
| 2002/0152422 A1 | 10/2002 | Sharma |
| 2002/0156970 A1 | 10/2002 | Stewart |
| 2002/0171966 A1 | 11/2002 | Ottesen |
| 2002/0178326 A1 | 11/2002 | Ohta |
| 2002/0198891 A1 | 12/2002 | Li |
| 2002/0199075 A1 | 12/2002 | Jacobs |
| 2003/0009538 A1 | 1/2003 | Shah |
| 2003/0074550 A1 | 4/2003 | Wilks |
| 2003/0101320 A1 | 5/2003 | Chauvel |
| 2003/0110357 A1 | 6/2003 | Nguyen |
| 2003/0154314 A1 | 8/2003 | Mason |
| 2003/0154337 A1 | 8/2003 | Ohno |
| 2003/0158839 A1 | 8/2003 | Faybishenko |
| 2003/0177305 A1 | 9/2003 | Hetrick |
| 2003/0191916 A1 | 10/2003 | McBrearty |
| 2003/0202377 A1 | 10/2003 | Harari |
| 2003/0212660 A1 | 11/2003 | Kerwin |
| 2003/0212857 A1 | 11/2003 | Pacheco |
| 2004/0003003 A1 | 1/2004 | McCartney |
| 2004/0003223 A1 | 1/2004 | Fortin |
| 2004/0010639 A1 | 1/2004 | Inoue |
| 2004/0015504 A1 | 1/2004 | Ahad |
| 2004/0019762 A1* | 1/2004 | Fukuoka et al. ............ 711/203 |
| 2004/0024795 A1 | 2/2004 | Hind |
| 2004/0034765 A1 | 2/2004 | O'Connell |
| 2004/0044776 A1 | 3/2004 | Larkin |
| 2004/0059747 A1 | 3/2004 | Olarig |
| 2004/0068627 A1 | 4/2004 | Sechrest |
| 2004/0078508 A1 | 4/2004 | Rivard |
| 2004/0093463 A1* | 5/2004 | Shang ........................ 711/113 |
| 2004/0103238 A1 | 5/2004 | Avraham |
| 2004/0107200 A1 | 6/2004 | Sjogren |
| 2004/0136259 A1 | 7/2004 | Klint |
| 2004/0153694 A1 | 8/2004 | Nicholson |
| 2004/0162950 A1 | 8/2004 | Coulson |
| 2004/0168018 A1 | 8/2004 | Aasheim |
| 2004/0172576 A1 | 9/2004 | Yoshii |
| 2004/0174631 A1 | 9/2004 | Tanaka |
| 2004/0221089 A1 | 11/2004 | Sato |
| 2004/0230743 A1 | 11/2004 | Ware |
| 2004/0243612 A1* | 12/2004 | Bailey ........................ 707/101 |
| 2005/0005188 A1 | 1/2005 | Hsu |
| 2005/0021907 A1 | 1/2005 | Shimada |
| 2005/0111260 A1 | 5/2005 | Nazarian |
| 2005/0125708 A1 | 6/2005 | Simon |
| 2005/0138283 A1 | 6/2005 | Garney |
| 2005/0141284 A1 | 6/2005 | Futatsuyama |
| 2005/0145923 A1 | 7/2005 | Chen |
| 2005/0149750 A1 | 7/2005 | Lisanke |
| 2005/0160223 A1 | 7/2005 | Chen |
| 2005/0172067 A1 | 8/2005 | Sinclair |
| 2005/0193160 A1 | 9/2005 | Bhatt et al. |
| 2005/0204091 A1 | 9/2005 | Kilbuck |
| 2005/0228964 A1 | 10/2005 | Sechrest |
| 2005/0235119 A1 | 10/2005 | Sechrest |
| 2005/0239494 A1 | 10/2005 | Klassen |
| 2005/0246487 A1* | 11/2005 | Ergan et al. ................. 711/113 |
| 2005/0251617 A1 | 11/2005 | Sinclair |
| 2005/0262378 A1 | 11/2005 | Sleeman |
| 2005/0286855 A1 | 12/2005 | Saitou |
| 2006/0010293 A1 | 1/2006 | Schnapp |
| 2006/0074953 A1 | 4/2006 | Dettinger |
| 2006/0075185 A1 | 4/2006 | Azzarito |
| 2006/0080553 A1 | 4/2006 | Hall |
| 2006/0087893 A1 | 4/2006 | Nishihara |
| 2006/0090031 A1* | 4/2006 | Kirshenbaum et al. ........ 711/113 |
| 2006/0106889 A1 | 5/2006 | Mannby |
| 2006/0112195 A1 | 5/2006 | Aoyama |
| 2006/0112215 A1* | 5/2006 | Kim et al. ..................... 711/103 |
| 2006/0136472 A1 | 6/2006 | Jujjuri |
| 2006/0136664 A1 | 6/2006 | Trika |
| 2006/0155931 A1* | 7/2006 | Birrell et al. .................. 711/115 |
| 2006/0177067 A1 | 8/2006 | Kim |
| 2006/0236034 A1 | 10/2006 | Pomaranski et al. |
| 2006/0248276 A1 | 11/2006 | Kilian et al. |
| 2006/0248387 A1 | 11/2006 | Nicholson |
| 2006/0277359 A1 | 12/2006 | Faber |
| 2007/0005882 A1 | 1/2007 | Gallagher |
| 2007/0011405 A1 | 1/2007 | Adusumilli |
| 2007/0043787 A1 | 2/2007 | Cannon |
| 2007/0043929 A1* | 2/2007 | Safford et al. ................ 711/207 |
| 2007/0061511 A1 | 3/2007 | Faber |
| 2007/0073764 A1 | 3/2007 | Oks |
| 2007/0150966 A1* | 6/2007 | Kirschner et al. .............. 726/30 |
| 2007/0156954 A1 | 7/2007 | Trika |
| 2007/0162700 A1 | 7/2007 | Fortin |
| 2007/0207800 A1 | 9/2007 | Daley |
| 2007/0208910 A1 | 9/2007 | Koseki |
| 2007/0233939 A1 | 10/2007 | Kim |
| 2007/0294474 A1 | 12/2007 | Panabaker |
| 2008/0010401 A1 | 1/2008 | Royer, Jr. |
| 2008/0010415 A1 | 1/2008 | Sawdey |
| 2008/0162485 A1 | 7/2008 | Long |
| 2008/0172519 A1* | 7/2008 | Shmulevich et al. ......... 711/103 |
| 2008/0183958 A1 | 7/2008 | Cheriton |
| 2009/0144495 A1 | 6/2009 | Kirshenbaum |
| 2009/0150335 A1* | 6/2009 | Latorre et al. ................... 707/2 |
| 2009/0150599 A1 | 6/2009 | Bennett |
| 2009/0150611 A1 | 6/2009 | Fortin |
| 2009/0287890 A1 | 11/2009 | Bolosky |
| 2010/0070701 A1 | 3/2010 | Iyigun |
| 2010/0070747 A1 | 3/2010 | Iyigun |
| 2010/0082550 A1 | 4/2010 | Cong |
| 2010/0199043 A1 | 8/2010 | Sechrest |
| 2010/0199063 A1 | 8/2010 | Sechrest |
| 2010/0217929 A1 | 8/2010 | Kirshenbaum |
| 2011/0197016 A1 | 8/2011 | Cong |
| 2011/0276743 A1 | 11/2011 | Kirshenbaum |
| 2011/0314202 A1 | 12/2011 | Iyigun |
| 2012/0047323 A1 | 2/2012 | Sareen |
| 2012/0102265 A1 | 4/2012 | Cong |
| 2012/0173824 A1 | 7/2012 | Iyigun |

FOREIGN PATENT DOCUMENTS

| | | |
|---|---|---|
| EP | 0 547 992 | 6/1993 |
| EP | 0712067 | 5/1996 |
| EP | 0744697 | 11/1996 |
| JP | 01-303547 | 12/1989 |
| JP | 02-039256 | 2/1990 |
| JP | 03-294942 | 12/1991 |
| JP | 04-246746 | 9/1992 |
| JP | 05-062329 | 3/1993 |
| JP | 05-094353 | 4/1993 |
| JP | 05-158797 | 6/1993 |
| JP | 05-225066 | 9/1993 |
| JP | 05-282889 | 10/1993 |
| JP | 06-035802 | 2/1994 |
| JP | 06-083708 | 3/1994 |
| JP | 06-231043 | 8/1994 |

(56) References Cited

FOREIGN PATENT DOCUMENTS

| | | |
|---|---|---|
| JP | 06-236351 | 8/1994 |
| JP | 07-253935 | 10/1995 |
| JP | 08-263380 | 10/1996 |
| JP | 09-106366 | 4/1997 |
| JP | 09-146710 | 6/1997 |
| JP | 10-040170 | 2/1998 |
| JP | 10-091488 | 4/1998 |
| JP | 10-154101 | 6/1998 |
| JP | 11-316699 | 11/1999 |
| JP | 11-338641 | 12/1999 |
| JP | 2001-027967 | 1/2001 |
| JP | 2001-067258 | 3/2001 |
| JP | 2001-250315 | 9/2001 |
| JP | 2002-259186 | 9/2002 |
| JP | 2003-076498 | 3/2003 |
| JP | 2003-196032 | 7/2003 |
| JP | 2003-280950 | 10/2003 |
| JP | 2004-021370 | 1/2004 |
| JP | 2004-054845 | 2/2004 |
| JP | 2004-272324 | 9/2004 |
| JP | 2005-044010 | 2/2005 |
| JP | 2007-007185 | 1/2007 |
| KR | 10-1999-0019377 | 3/1999 |
| KR | 10-2000-0039727 | 7/2000 |
| RU | 2010317 | 3/1994 |
| TW | 479194 | 3/2002 |
| TW | 502165 | 9/2002 |
| WO | WO 93/18461 | 9/1993 |
| WO | WO 97/26600 | 7/1997 |
| WO | WO 01/11486 | 2/2001 |
| WO | WO 01/57675 | 8/2001 |
| WO | WO 01/75581 | 10/2001 |
| WO | WO 02/01364 | 1/2002 |

OTHER PUBLICATIONS

Archer, Tom and Ayers, Matt, "ReadyBoost Q&A," Jun. 2006, http://blogs.msdn.com/b/tomarcher/archive/2006/06/02/615199.aspx.*
CDRinfo, "Microsoft Explains Vista ReadyBoost," Nov. 2006, http://cdr-info.com/Sections/News/Details.aspx?NewsId=19077.*
Vitter, External Memory Algorithms, PODS, 1998, pp. 119-128.
Ekman et al., TLB and Snoop Energy-Reduction using Virtual Caches in Low-Power Chip-Multiprocessors, ISLPED, Aug. 2002, pp. 243-246.
EP Supplementary Search Report, Reference FB24240, Application No. 09813565.0-1229 / 2329360 PCT/US2009056419, Apr. 3, 2012.
International Search Report from PCT/US2009/056419, reference 325076-03 WO, Mar. 12, 2010.
International Search Report from PCT/US2009/063127, reference 325668-02 WO, May 31, 2010.
Zhu, "Power Aware Storage Cache Management", Department of Computer Science, University of Illinois at Urbana-Champaign, Urbana, IL 61801. May 2005.
Bisson, "A Hybrid Disk-Aware Spin-Down Algorithm with 110 Subsystem Support", Performance, Computing, and Communications Conference, Apr. 11-13, 2007.
"Non-Volatile Memory Host Controller Interface (NVMHCI) 1.0". Apr. 14, 2008. 65 Pages.
Greenan, "CompulsiveFS: Making NVRAM Suitable for Extremely Reliable Storage". Feb. 13-16, 2007.
Darden, "Data Integrity: The Dell|EMC Distinction", May 2002. 5 Pages.
CN Notice on the First Office Action for Application No. 200980136912.9, Jan. 14, 2013.
Ohn, "Path conscious caching of B+ tree indexes in a shared disks cluster", ScienceDirect, Dec. 4, 2006.
EP Communication for Application No. 09826570.5-1229 / 2353081 PCT/US2009063127, reference FB24586, May 29, 2012.
CN Notice on the First Office Action for Application No. 200980145878.1, Jan. 29, 2013.
Budiu, "A Dual-Disk File System: ext4", Apr. 16, 1997.
CN Notice on the First Office Action for Application No. 200980137190.9, Oct. 24, 2012.
CN Notice on the Second Office Action for Application No. 200980137190.9, Mar. 20, 2013.
Dove, "Windows XP for embedded applications", Jul. 10, 2008.
EP Communication for Application No. 09814983.4-2224/2329361 PCT/US2009055198, Reference FB24231, Oct. 10, 2012.
iSCSI, "Performance evaluations of iSCSI implementation", printed Jan. 10, 2008.
JP Notice of Rejection for Application No. 2011-527865, Oct. 16, 2012.
Matthews, "Improving File System Performance With Adpative Methods", Fall 1999.
Mitchell, "Managing Cache Coherence in Multiprocessor Computer Systems", printed Jul. 10, 2008.
Nieplocha, "ARMCI: A Portable Aggregate Remote Memory Copy Interface", Oct. 30, 2000.
Novell Documentation: NetWare 6, "NSS Features and Benefits", printed Jul. 10, 2008.
PCT International Search Report and Written Opinion for Application No. PCT/US2009/055198, reference 324268-02 WO, Feb. 26, 2010.
Rosenblum, "The Design and Implementation of a Log-Structured File System", Proceedings of the 13th ACM Symposium on Operating Systems Principles, Jul. 24, 1991.
Anderson, "A Case for Buffer Servers". Proceedings of the Seventh Workshop on Hot Topics in Operating Systems, Mar. 28-30, 1999.
Andrews, "Combining Language and Database Advances in an Object-Oriented Development Environment", Conference on Object-Oriented Programming Systems, Languages, and Applications(OOPSLA'87), Oct. 4-8, 1987.
Beard, "Multilevel and Graphical Views of Metadata", Fifth International Forum on Research and Technology Advances in Digital Libraries, Apr. 22-24, 1998.
Beitner, "Multimedia Support and Authoring in Microcosm: an extended model", 1994.
Berg, "How Do I Create Persistent Java Objects?", Dr. Dobb's Journal, Apr. 1997.
Bhattacharya, "Coordinating Backup/Recovery and Data Consistency Between Database and File Systems", Proceedings of the 2002 ACM SIGMOND International Conference on Management of Data, Jun. 3-6, 2002.
Billiris, "The Performance of Three Database Storage Structures for Managing Large Objects", Proceedings of the 1992 ACM SIGMOD International Conference on Management of Data, Jun. 2-5, 1992.
Booch, "Object-Oriented Analysis and Design with Applications", The Benjainin/Cummings Publishing Company, Inc., 1994.
Bracchi, "Binary Logical Associations in Data Modelling", Modelling in Data Base Management Systems, Proceedings of the IFIP Working Conference on Modelling in Data Base Management Systems, Jan. 5-8, 1976.
Bullock, "Recovery of Data Pages After Partial Page Writes", IBM Technical Disclosure Bulletin, Aug. 1, 1991.
Bunernan, "Inheritance and Persistence in Database Programming Languages", Proceedings of the 1986 ACM SIGMOD international Conference on Management of Data, May 28-30, 1986.
Cammarata, "Extending a Relational Database with Deferred Referential Integrity Checking and Intelligent Joins", Proceedings of the 1989 ACM SIGMOD International Conference on Management of Data, May 31-Jun. 2. 1989.
Chien, "Concurrent Aggregates (CA): Design and Experience with a Concurrent Object-Oriented Language Based on Aggregates". Journal of Parallel and Distributed Computing, Mar. 1995.
Chryssostornidis; "Geometric Modeling Issues in Computer Aided Design of Marine Structures", Marine Technology Society Journal, vol. 22, No. 2, Dec. 1988.
Ciccozz , "Microsoft Press Computer Dictionary", Third Edition, 1997.
CN Notice on First Office Action for Application No. 200510083792. 4, Feb. 1, 2008.
CN Notice on First Office Action for Application No. 200510116208. 0, Jun. 6, 2008.

(56) References Cited

OTHER PUBLICATIONS

CN The Second Office Action for Application No. 200510083792.4, Jun. 27, 2008.
CN The First Office Action for Application No. 200680047384.6, Jan. 22, 2010.
CN Decision on Rejection for Application No. 200680047384.6, Nov. 11, 2010.
"Computervision Launches Design Automation Development Platform for Windows, UNIX Desktop Applications", PR Newswire, Jan. 10, 1995.
D'Andrea, "UniSQL's Next-Generation Object-Relational Database Management System", Proceedings of the 1996 ACM SIGMOD International Conference on Management of Data, vol. 25, No. 3, Sep. 1996.
Darby, "Object Serialization in Java 1.1: Making Objects Persistent", WEB Techniques, Sep. 1997.
"Developer's Guide to Apple Data Detectors—For Version 1.0.2", Apple Computer, Inc., Dec. 1, 1997.
Dietrich, Jr., "TGMS: An Object-Oriented System for Programming Geometry", Software-Practice and Experience, Oct. 1989.
Dobashi, "Skylight for Interior Lighting Design", Eurographics '94 Conference Proceedings, vol. 13, No. 3, 1994.
Dorsch, "Accel signs with IBM to buy Album PCB unit—Accel Technologies acquires the assets to Altium's P-CAD business unit", LookSmart's FindArticles, Electronic News, Jan. 16, 1995.
EP Communication for Application No. 05103697.8-2201, Reference EP34979TE900dfi, May 21, 2007.
EP Communication for Application No. 05109295.5-2201, Reference EP3683ORK900dfi, Jun. 8, 2007.
EP Communication for Application No. 03022573.4-1229, Reference EP28554-/df, Aug. 2, 2007.
EP Communication for Application No. 05103697.8-2201, Reference EP349791-E900dfi, Oct. 26, 2007.
EP Communication for Application No. 03022573.4-1229, Reference EP28554-/df, Nov. 8, 2007.
EP Communication for Application No. 05103690.3-2201, Reference EP34981TE900kap, Apr. 24, 2008.
EP Communication for Application No. 05103697.8-2201, Reference EP34979TE900dfi, Jun. 17, 2008.
EP Communication for Application No. 03022573.4-1229, Reference EP28554-/df, Oct. 6, 2008.
EP Communication for Application No. 05103697.8-2201, Reference EP34979TE900dfi, Nov. 7, 2008.
EP Supplementary Search Report for Application No. 06839426, May 4, 2009.
EP Summons to attend or proceedings for Application No. 05109295.5-2201/1650666, Reference EP36830RK900dfi, Mar. 8, 2012.
EP Communication for Application No. 09813565.0-1229/2329360 PCT/US2009056419, Apr. 3, 2012.
EP Communication for Application No. 09826570.5 229/2353081 PCTIUS2009063127, Reference FB24586, May 29, 2012.
EP Decision to refuse a European Patent for Application No. 05109295.5-2201, Reference EP3683ORK900dfi, Aug. 7, 2012.
EP Provision of the minutes for Application No. 05109295.5-2201, Reference EP3683ORK900dfi, Aug. 7, 2012.
Fegaras, "Optimizing Object Queries Using an Effective Calculus", ACM Transactions on Database Systems, vol. 25, No. 4, Dec. 2000.
Findler, "Contract Soundness for Object-Oriented Languages", Proceedings of the 2001 ACM SIGPLAN Conference on Object-Oriented Programming Systems, Languages and Applications, Oct. 14-18, 2001.
Foley, "Computer Graphics: Principles and Practices", Second Edition, Addison-Wesley Publishing Company, Chapter 5, pp. 201-227, 1990.
Fox, "Invention: The phantom car", NewScientist.com, Aug. 17, 2005.
Friis-Christensen; "Requirements and Research Issues in Geographic Data Modeling", Proceedings of the 9th ACM International Symposium on Advances in Geographic Information Systems, Nov. 9-10, 2001.
Fuh, "Implementation of SQL3 Structured Types with Inheritance and Value Substitutability", Proceedings of 25th International Conference on Very Large Data Bases (VLDB '99), Sep. 7-10, 1999.
Garret, Jr., "An Object-Oriented Environment for Representing Building Design and Construction Data", Advanced Construction Technology Center, Mar. 15, 1989.
Gosciriski, "Distributed Operating Systems: The logical Design", Addison-Wesley Publishers Ltd., 1991.
Harrison, "Structure Editors: User-Defined Type Values and Type Inference", International Conference on Software Methods and Tools (SMT 2000), Nov. 6-9, 2000.
Haverlock, "Object Serialization, Java, and C++", Dr. Dobb's Journal, Aug. 1, 1998.
Hay, "Data Model Patterns: Convention of Thought", Dorset House Publishing, Chapter 4 (pp. 46-67), and Chapter 12 (pp. 235-259), 1996.
Hernandez, "The Merge/Purge Problem for Large Databases", Proceedings of the 1995 ACM SIGMOD International Conference on Management of Data, May 22-25, 1995.
Hsiao, "DLFM: A Transactional Resource Manager", Proceedings of the 2000 ACM SIGMOD International Conference on Management of Data, May 16-18, 2000.
"Improved Recovery from Partial Page Writes of Data Pages", IBM Technical Disclosure Bulletin, vol. 36, No. 5, May 1993.
"Referential Integrity Implementation Details and Advantages", IBM Technical Disclosure Bulletin, vol. 38, No. 3, Mar. 1995.
JP Notice of Rejection for Application No. 2005-135274, Sep. 24, 2010.
JP Notice of Rejection for Application No. 2005-134492, Jan. 25, 2011.
JP Notice of Rejection for Application No. 2005-306948, Mar. 11, 2011.
JP Notice of Rejection for Application No. 2005-135274, Sep. 9, 2011.
JP Notice of Reasons for Rejection for Application No. 2008-545888, Apr. 19, 2012.
JP Notice of Reasons for Rejection for Application No. 2008-545888, Aug. 29, 2012.
Kaneko, "Design of 3D CG Data Model of "Move" Animation Database System", Advanced Database Research and Development Series, Proceedings of the Second Far-East Workshop On Future Database Systems, Apr. 26-28, 1992.
Kaneko, "Towards Dynamics Animation on Object-Oriented Animation Database System 'MOVE'", Advanced Database Research and Development Series. Proceedings of the Third International Symposium on Database Systems for Advanced Applications, Apr. 6-8, 1993.
Katz, "Toward a Unified Framework for Version Modeling in Engineering Databases", ACM Computing Surveys, vol. 22, No. 4, Dec. 1990.
Kawabe, "A Framework for 3D Modeling: Constraint-Based Description and Non-Manifold Geometric Modeling", Organization of Engineering Knowledge for Product Modelling in Computer Integrated Manufacturing, A Collection of Contributions Based on Lectures Presented at the 2nd Toyota Conference, Oct. 2-5, 1988.
Kempfer, "CAD Jumps on Windows 3.1 Bandwagon", Computer Aided Engineering, Nov. 1993.
Khan, "A Performance Evaluation of Storing XML Data in Relational Database Management Systems", Third International Workshop on Web Information and Data Management (WIM 2001), Nov. 9, 2001.
Khoshafian, "Object Identity", Proceedings of the ACM Conference on Object-Oriented Programming Systems, Languages, and Applications (OOPSLA'86), Sep. 1986.
Kiesling, "ODBC in UNIX Environments", Dr. Dobb's Journal, Dec. 2002.
King, "TriStarp—An Investigation into the Implementation and Exploitation of Binary Relational Storage Structures", Proceedings of the 8th British National Conference On Data Bases (BNCOD-8), Jul. 9-11, 1990.
Krouse, "Geometric Models for CAD/CAM", Machine Design, Jul. 24, 1980.

(56) References Cited

OTHER PUBLICATIONS

Larsen, "Improve Programming Performance with Intel® Flash Memory Enhanced Factory Programming," Intel Corporation, printed May 9, 2006.

LeBlanc, "Design Data Storage and Extraction Using Objects", Concurrent Engineering: Research and Applications, Mar. 1993.

Leontiev, "On Type Systems for Object-Oriented Database Programming languages", ACM Computing Surveys, vol. 34, No. 4, Dec. 2002.

Levy, "Incremental Recovery in Main Memory Database Systems", IEEE Transactions on Knowledge and Data Engineering, vol. 4, No. 6, Dec. 1992.

Lim, "Transaction Processing in Mobile, Heterogeneous Database Systems", IEEE Transactions on Knowledge and Data Engineering, vol. 14, No. 6, Nov./Dec. 2002.

Mallet, "Myrtle: A set-oriented meta-interpreter driven by a "relational" trace for deductive databases debugging", Jan. 1999.

Mariani, "Oggetto: An Object Oriented Database Layered on a Triple Store", The Computer Journal, vol. 35, No. 2, Apr. 1992.

McMahon, "SED—A Non-interactive Text Editor", Bell laboratories, Jan. 10, 1979.

"Mechanical Design Software", Computer-Aided Engineering, Dec. 1993.

Melton, "SQL and Management of External Data", ACM SIGMOD Record, vol. 30, No. 1, Mar. 2001.

Mitchell, "The logic of Architecture", Massachusetts Institute of Technology, pp. 139-143. Apr. 26, 1990.

Motoazabu, "IEEE1394: A Dream interface at the Turning Pont", PC User, Softbank Publishing Corporation, Oct. 24, 1999.

Navathe, "Evolution of Data Modeling for Databases", Communications of the ACM, vol. 35, No. 9, Sep. 1992.

Nelson, "Generic Support for Caching and Disconnected Operation", 4th Workshop on Workstation Operating Systems (WWOS-IV), Oct. 14-15, 1993.

Nijssen, "Conceptual Schema and Relational Database Design: A Fact Oriented Approach", Prentice Hall, pp. 9-33, 42-43, 48-51, and 156-171, Jun. 1989.

"Oracle9i SQL Reference", Release 2 (9.2), Oct. 2002.

Orenstein, "Query Processing in the ObjectStore Database System", Proceedings of the 1992 ACM SIGMOD International Conference on Management of Data, Jun. 2-5, 1992.

Ottogalli, "Visualisation of Distributed Applications for Performance Debugging", International Conference on Computational Science (ICCS 2001), May 28-30, 2001.

Pachet, "A Combinatorial Approach to Content-based Music Selection", Proceedings of the IEEE International Conference on Multimedia Computing and Systems (ICMCS 1999), vol. 1, Jun. 7-11, 1999.

Papiani, "A Distributed Scientific Data Archive Using the Web, XML and SQL/MED", SIGMOD Record, Vol. 28, No. 3, Sep. 1999.

PCT International Search Report and Written Opinion for Application No. PCT/US2006/048402, Reference 314396.02 WO, May 8, 2007.

Ponnekanti, "Online Index Rebuild", Proceedings of the 2000 ACM SIGMOD International Conference on Management of Data, May 16-18, 2000.

Powell, "Object, References, Identifiers and Equality White Paper", SunSoft, OMG TC Document No. 93.7.5, Jul. 2, 1993.

Prosise, "2-D Drafting: Why Pay More?", PC Magazine, Feb. 23, 1993.

Ramsey, "An Algebraic Approach to File Synchronization", Proceedings of the Joint 8th European Software Engineering Conference (ESEC), and the 9th ACM SIGSOFT Symposium on the Foundations of Software Engineering (FSE-9) , Sep. 10-14, 2001.

Read III, "Developing the Next Generation Cockpit Display System", Proceedings of the IEEE 1996 National Aerospace and Electronics Conference (NAECON), May 20-23, 1996.

Reiner, "Benefits of X-based Three-Tier Client/Server Model with ESRI Applications", Virtual Solutions, 1995.

Rouse, "CAD Pioneers Are Still Trailblazing", Machine Design, vol. 59, No. 25, Oct. 22, 1987.

Roussopoulos, "Using Semantic Networks for Data Base Management", Proceedings of the First International Conference on Very Large Data Bases (VLDB'75), Sep. 22-24, 1975.

RU Official Action for Application No. 2003129662, Nov. 11, 2007.

"Optimization of CF Host Operation," SanDisk® Corporation, Feb. 28, 2005.

Santos, "Computer Aided Mechanicai Engineering Design Environment for Concurrent Design Process", Proceedings of the 1993 ITEC Workshop on Concurrent Engineering, Simulation in Concurrent Engineering, May 4-6, 1993.

Seshadri, "Enhanced abstract data types in object-relational databases", The VLB Journal, The International Journal on Very Large Databases, vol. 7, No. 3, Aug. 1998.

Sirnoes, "A RISC-Microcontroller Based Photovoltaic System for Illumination Applications", Fifteenth Annual IEEE Applied Power Electronics Conference and Exposition (APEC 2000), Feb. 6-10, 2000.

Simon, "Strategic Database Technology. Management for the Year 2000", Morgan Kaufmann Publishers, Inc., pp. 3-33, 55-69, May 1995.

Singhal, "DDB: An Object Oriented Design Data Manager for VLSI CAD", Proceedings of the 1993 ACM SIGMOD International Conference on Management of Data, May 26-28, 1993.

"Optimizing Program/Erase Times", Spansion™, Sep. 2, 2004.

Sreekanth, "A Specification EnvirOnMent for Configuring a Discrete-Part Manufacturing System Simulation Infrastructure", International Conference on Systems, Man and Cybernetics, Systems Engineering in the Service of Humans, Oct. 17-20, 1993.

Sreenath, "A hybrid computation environment for multibody simulation", Mathematics and Computers in Simulation, vol. 34, Issue 2, Aug. 1992.

Stevens, "Value in 3-D", Industry Week, Jan. 8, 1996.

Stonebraker, "The Case for Partial Indexes", SIGMO Record, vol. 18, No. 4, Dec. 1989.

Strickland, "Intersection of Relational and Object", Proceedings of the AM/FM International Conference XVII, Mar. 14-17, 1994.

Sutherland, "The Hybrid Object-Relational Architecture (HORA): An Integration of Object-Oriented and Relational Technology", Proceedings of the 1993 ACM/SIGAPP Symposium on Applied Computing, States of the Art and Practice, Feb. 14-16, 1993.

Suzuki, "Geometric Modeling for Modeling Products", Proceedings of the Third International Conference on Engineering Graphics and Descriptive Geometry, vol. 2, Jul. 11-16, 1988.

Taylor, "An Integrated Robot System Architecture", Proceedings of the IEEE, vol. 71, No. 7, Jul. 1983.

TW Search Report for Application No. 094114140, Nov. 22, 2011.

Varlarnis, "Bridging XML-Schema and relational databases. A system for generating and manipulating relational databases using valid XML documents", Proceedings of the 2001 ACM Symposium on Document Engineering, Nov. 9-10, 2001.

Watanabe, "Knowledge Integration for Architectural Design", Knowledge-Based Computer-Aided Architectural Design, Jul. 1994.

Waugh, "Specifying metadata standards for metadata tool configuration", Computer Networks and ISDN Systems, Proceedings of the Seventh International World Wide Web Conference, Apr. 14-18, 1998.

Wilcox, "Object Databases: Object methods in distributed computing" Dr. Dobbs Journal, Nov. 1994.

Wold, "Content-Based Classification, Search, and Retrieval of Audio", IEEE MultiMedia, vol. 3, Issue 3, Sep. 1996.

Yoshikawa, "XRel: A Path-Based Approach to Storage and Retrieval of XML Documents Using Relational Databases", ACM Transactions on Internet Technology, vol. 1, No. 1, Aug. 2001.

CA Examiner's Report for Application No. 2,523,761, Feb. 26, 2013.

IL Notification of Defects in Patent Application No. 191502, Feb. 17, 2013.

JP Notice of Rejection for Application No. 2012-111004, May 14, 2013.

* cited by examiner

MANAGEMENT OF EXTERNAL MEMORY FUNCTIONING AS VIRTUAL CACHE

BACKGROUND

1. Field of Invention

This invention relates to managing the use of auxiliary memory devices as cache memory.

2. Related Art

Improvements to central processing unit (CPU) hardware have, in general, far outpaced advances made in disk drive memory in terms of speed of operation. As a result, a common bottleneck to improved computer performance has been the time needed to retrieve data from disk drive memory for use by the CPU. To help alleviate this problem, computer systems are commonly operated so as to store (or cache) data needed by the CPU in main system memory, e.g., RAM that is typically located on the computer motherboard and has relatively fast read/write times, especially as compared to magnetic disk memory. Thus, needed data can be moved from a disk drive to the main system memory (preferably before the data is needed by the CPU), helping to speed the computer's operation.

SUMMARY OF INVENTION

The inventors have appreciated that the use of auxiliary memory, e.g., memories that may or may not be located on the motherboard, in a computer system as cache memory can improve a computer system's performance, particularly if the auxiliary memory read/write time is faster than the memory (ies) on which most of the system's data is stored (often a disk drive or drives). With the more widespread use of flash memory (e.g., in the form of USB memory sticks or other similar devices), a computer system often has access to memory that operates at a faster rate than a disk drive typically employed to store the bulk of a computer's data. If such auxiliary memory has usable space, the memory can help to speed computer function by caching data from slower memories.

In accordance with an aspect of the invention, auxiliary memories that are removable from the computer system may be effectively used as cache memory. (As used herein, removable means that the memory can be ejected or otherwise disconnected from the computer without causing the computer to crash.) For example, the computer system may use a USB flash memory that a user has plugged into a USB port to cache data for use by the CPU. Management of the cached data may be performed so that even in the event that the auxiliary memory is disconnected or otherwise removed from the system, no loss of data will occur. In one embodiment, only so-called "clean" pages, e.g., blocks of data about 4 kB in size that are not subject to modification, are cached on removable and/or non-removable auxiliary memory. Thus, clean pages may have a backup on another memory, such as an internal disk drive, so that removal of the memory will not cause loss of data. Other pages that may be modified, so-called "dirty" pages, may be cached only on non-removable memory, or may also be stored on removable memory if the system is suitably equipped (e.g., has the ability to ask the user to reconnect a removable memory to the computer if the user wants the system/process to continue running or other ability to recover from the loss of the "dirty" page data).

In another aspect of the invention, the computer system may cache virtual pages on an auxiliary memory or memories. In typical caching techniques, the system caches data at a physical level, i.e., blocks of data identified by physical address in a memory (such as a disk drive) are stored on a second memory (such as a cache memory). The inventors have appreciated that this approach may have disadvantages, including inefficient use of cache memory space. For example, a particular process may only require a relatively small portion of a data block, but the memory manager will typically continue to cache the entire block despite the fact that most of the block will not be used. As another example, if a disk drive is defragmented (which essentially involves the physical rearrangement of data on a disk to free up disk space), a complicated scheme is required to relay to the cache management regarding where data to be cached has been moved on the disk so that appropriate data can be cached.

In one aspect of the invention, data may be cached on a virtual level, e.g., in a way that does not identify a cached page by its physical address on memory device, but rather by a virtual identifier that describes the identity of the cached page at a more abstract level. For example, pages may be virtually identified by a page key that includes a tuple of a process employing the page and a virtual address for the page, or a name or handle of a file that includes the page and a file offset. Other virtual page identifiers may be used as suitable. By identifying a page at a virtual level as opposed to a physical level, more efficient caching may be performed since only those pages expected to be used by the CPU need be cached, potentially avoiding the caching of data that is unlikely to be used. Also, since a process may clearly identify which page(s) are released, e.g., by file or process, the cache management system may rapidly release the corresponding data from the cache.

In another aspect of the invention, data may be cached in one or more auxiliary memories that are removable from the computer system. Such auxiliary memories may include any suitable memory type, such as flash memory, disk drive memory, etc., and may be removable from the computer system by physically disconnecting the memory from the computer system while the computer system continues to otherwise operate normally (e.g., by unplugging a flash memory stick from a computer) and/or by disabling a connection between the computer system and the auxiliary memory (e.g., by disabling a local area network connection via which the computer system communicates with an auxiliary memory). Data may be cached on the auxiliary memory in any suitable way, such as by virtual address as discussed above, and/or by physical address. In accordance with an aspect of the invention, the accuracy of data cached on a removable auxiliary memory may be verified if the auxiliary memory is disconnected from the computer system, and then reconnected.

In one aspect of the invention, a computer system includes a processor adapted to execute instructions to carry out one or more functions, and a main system memory adapted to store a plurality of pages of data that are used by the processor in performing the one or more functions. At least one auxiliary memory may be in communication with the processor and be adapted to store a plurality of pages of data for use by the processor, by the processor directly accessing the auxiliary memory and/or indirectly accessing the auxiliary memory by transferring data to be used by the processor from the auxiliary memory to main system memory. A cache manager (e.g., which may be part of a memory manager in the computer operating system) may control the caching of virtual pages of data for use by the processor on the auxiliary memory and may identify virtual pages using a virtual identifier that is not an address that defines a physical location of the virtual page on a memory. In one embodiment, virtual identifier includes a tuple of file and offset information, or a tuple of process and virtual address information. The auxiliary memory may be removable from the computer, and caching of pages may be managed so that loss of data due to removal of the memory is avoided.

In another aspect of the invention, a method of managing virtual pages cached in auxiliary memory of a computer system includes providing a computer system including a processor adapted to execute instructions to carry out one or more functions, a main system memory adapted to store a plurality of pages of data that are used by the processor in performing the one or more functions, and an auxiliary memory in (direct or indirect) communication with the processor. Virtual pages of data may be cached for use by the processor on the auxiliary memory, and the auxiliary memory may be disconnected from the computer system. In one embodiment, the auxiliary memory may be disconnected from the computer system without loss of the cached data.

In another aspect of the invention, a method of managing pages cached in memory of a computer system includes providing a computer system having a processor adapted to execute instructions to carry out one or more functions, main system memory adapted to store a plurality of pages of data that are used by the processor in performing the one or more functions, and an auxiliary memory in communication with the processor. The auxiliary memory may be adapted to store a plurality of pages of data for use by the processor and be removable from the computer system. Pages of data may be cached for use by the processor on the auxiliary memory, and the auxiliary memory disconnected from the computer system. The auxiliary memory may be reconnected to the computer system, and pages cached on the auxiliary memory may be verified to be consistent with corresponding page data stored in another memory of the computer system.

These and other aspects of the invention will be apparent from the following detailed description and claims.

BRIEF DESCRIPTION OF THE DRAWINGS

Aspects of the invention are described with reference to illustrative embodiments and the following drawings in which like numerals reference like elements, and wherein.

DETAILED DESCRIPTION

Aspects of the invention are described below with reference to illustrative embodiments. However, it should be appreciated that aspects of the invention are not limited to any of the particular embodiments. For example, embodiments are described below regarding a general purpose programmable computer with one or more auxiliary memories. However, it should be appreciated that aspects of the invention may be employed in any suitable environment, such as where auxiliary memory used as cache memory are linked by a network connection to the computer.

Figure 1:
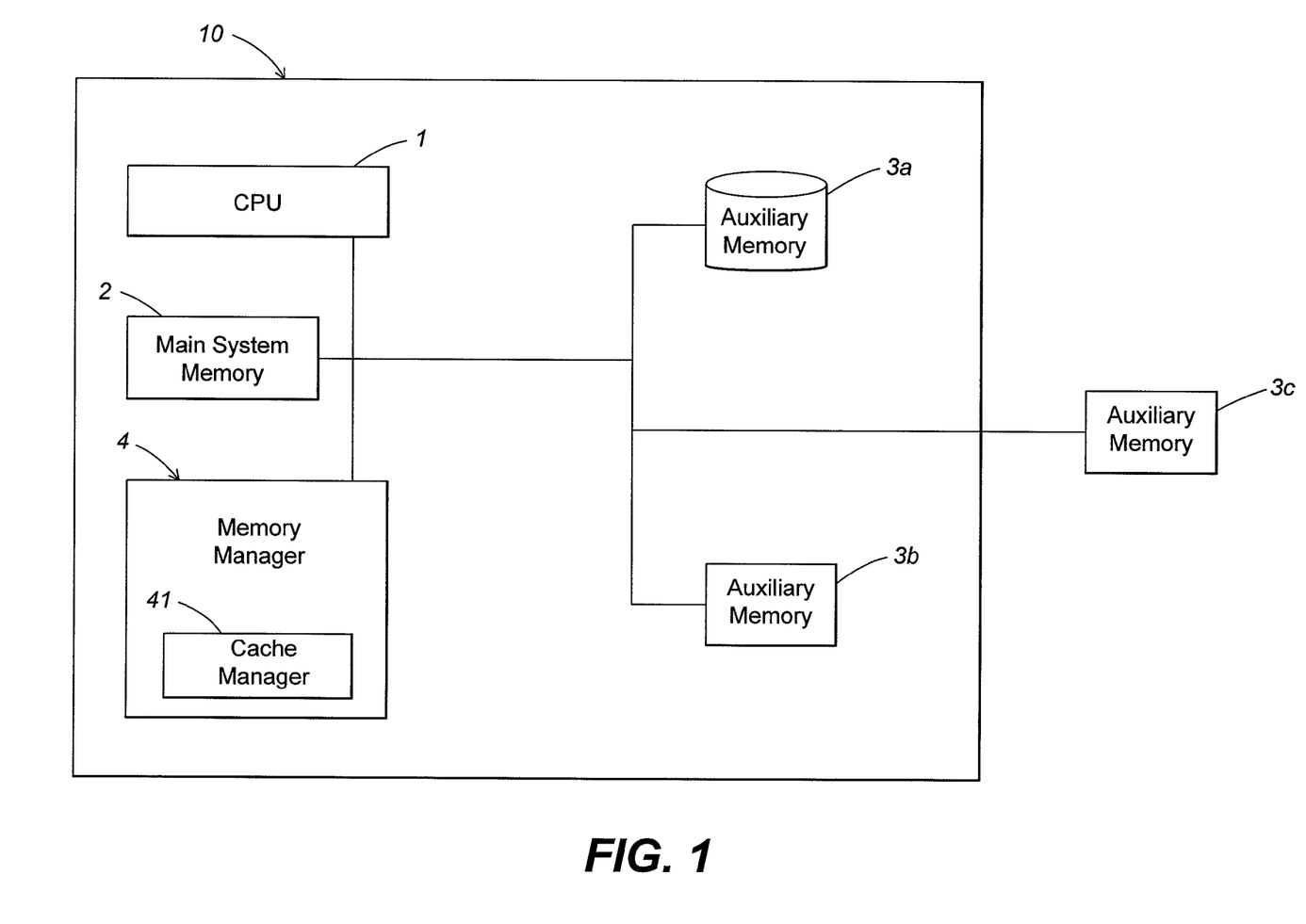
FIG. 1 shows a schematic block diagram of a computer arranged in accordance with aspects of the invention.

FIG. 1 shows a schematic block diagram of a computer 10 that is arranged in accordance with aspects of the invention. Although in this illustrative embodiment, only selected portions of the computer 10 are identified as being included in the computer 10, this is done for purposes of clarity and not to limit aspects of the invention in any way. For example, the computer 10 may include a display, a keyboard and/or other user input devices (such as a mouse, touch screen or other), communications devices (such as devices suitable for wireless and/or wired communications), as well as any suitable software or other instructions that may be executed by the computer 10 so as perform desired input/output or other functions.

In this illustrative embodiment, the computer 10 includes a central processing unit (CPU or processor) 1 and main system memory 2 that the processor 1 uses for performing its functions. The main system memory 2 may be located on a motherboard with the processor 1 and may have a relatively high read and/or write speed so that data exchanges with the processor 1 can be performed rapidly, e.g., may include RAM that the processor 1 uses to cache data for use in performing various operations. The computer 10 may also include one or more auxiliary memory devices 3, e.g., memories 3 that are not part of the main system memory and may or may not be located on a motherboard with the processor 1. Although the auxiliary memory devices 3 may function as cache memory in accordance with aspects of the invention, these devices 3 are not limited to functioning as a conventional cache memory. For example, the computer 10 may include as auxiliary memory 3 one or more disk drives 3a where a majority of data used by the computer 10 is stored, an optical memory 3b, and a flash memory device 3c. Other auxiliary memory may be provided, such as volatile or non-volatile RAM of any suitable form. Some of the memories 3 may be located within an outer casing of the computer 10, such as the disk drive 3a and the optical memory 3b, whereas others, such as the flash memory 3c may be located outside of the outer casing of the computer 10. Also, some of the memories, such as the disk drive 3a and the optical memory 3b, may not be removable from the computer 10, whereas other of the auxiliary memory, such as the flash memory device 3c, may be removable (e.g., by unplugging the flash memory 3c at a USB port, PCMCIA connection, a memory card reader or other connection to the computer 10). In some embodiments, auxiliary memory 3 may be provided via a network connection to the computer 10 (e.g., by a network server and/or client on the network), and in such cases the auxiliary memory 3 may be removable from the computer 10, i.e., can be physically disconnected from the computer and/or communication with the memory 3 can be disabled.

In accordance with one aspect of the invention, the computer 10 may store cache data on a removable auxiliary memory 3, such as the flash memory 3c. For example, a memory manager 4, which may be part of the operating system for the computer 10, may direct data to be used by the processor 1 that is located on the disk drive 3a to be cached on the flash memory 3c. The faster read and/or write time of the flash memory 3c as compared to the disk drive 3a may help to speed operation of the computer 10 and/or applications executed by the computer 10 (e.g., by reducing operation time perceived by a user), particularly if the main system memory 2 is full or otherwise cannot be used in an efficient way. The memory manager 4 may operate so that pages that are "in use", i.e., pages that can be modified by an application without operating system intervention, are cached only at the main system memory 2. However, other data may be cached on the auxiliary memory 3. The memory manager 4 may also operate so that only "clean" pages are cached on removable auxiliary memory 3. That is, only pages that are not modified or will not be modified whether by operating system intervention or not are stored on removable auxiliary memory 3. In this way, if the auxiliary memory 3 is removed, the memory manager 4 may resort to the copy of the page on the disk drive 3a or other memory. As for "dirty" pages, i.e., pages that may be or are modified, the memory manager 4 may cache such pages only on non-removable auxiliary memory 3 (or, of course, main system memory 2). In this way, the computer 10 will not lose modified pages due to removal of the auxiliary memory 3.

In accordance with another aspect of the invention, cached pages stored on removable (or non-removable) auxiliary memory 3 may be encrypted. This approach may help to ensure privacy of cached information (such as credit card numbers, bank accounts, passwords, etc.) that is stored on removable auxiliary memory 3, e.g., in case that sensitive information is cached on a removable memory 3 and the memory 3 is removed, taking the sensitive data with it. By encrypting the cached data, it may be difficult or impossible to recover the information from the removable memory 3 without the necessary encryption key or other information needed to recover the encrypted data. One possible way to encrypt cached pages is to generate a random key and encrypt the page(s) using the key and a suitable encryption algorithm. In another example, the key may be salted based on the specific device offset the page is being written to.

In another aspect of the invention, cached pages on auxiliary memory 3 may be compressed. For example, compression ratios of approximately 2:1 or 3:1, depending on the type of data or other factors may be possible, thereby reducing the amount of space needed to cache data. Cached pages that originate from a file, termed "file pages" herein, may experience a compression ratio of 2:1. Cached pages that cannot be shared and that originate from the virtual address space of a process, termed "private pages" herein, may experience a 3:1 compression ratio. As with all other aspects of the invention which may be combined with other aspects in any suitable way, compression of cached pages may be combined with encryption. In fact, in some embodiments, encryption of the cached data may result in compression of the data as well as encryption.

In another aspect of the invention, bytes of data on auxiliary memory 3 may be shared by multiple cached pages. For example, multiple pages containing the same data can be stored in the same location on the auxiliary memory 3 to further optimize space usage.

In another aspect of the invention, a data authenticity indicator may be generated and used to verify that a cached page (or pages) on an auxiliary memory remains unchanged after communication between the computer system and the auxiliary memory is interrupted (e.g., the auxiliary memory has been "removed" from the computer system). Communication with the auxiliary memory 3 may be interrupted in a variety of ways, such as by the computer 10 powering down, crashing, experiencing a power failure, hibernating, etc., a network connection being cut and/or the auxiliary memory 3 being removed from the computer 10. In such cases, the memory manager 4 cannot be assured that the cached data on the auxiliary memory 3 (or data on the source memory from which the cached data was obtained) has not been maliciously changed or otherwise modified without making some kind of verification. In one embodiment, a hash of cached data (or other cryptographic authenticity indicator for the data) on the auxiliary memory 3 may be generated, e.g., after each write of cached data to the auxiliary memory 3, and used in the case of communication interruption to verify that the cached data on the auxiliary memory 3 after reconnection to the computer 10 remains unchanged from before the communication interruption and/or to verify that cached data at the source memory (such as a disk drive) has not changed. The hash may be determined for each page, for each region of the auxiliary memory 3 and/or the entire memory 3. Before entering a sleep state, each memory 3 and/or the memory manager 4 may mark all of the regions of the memory 3 having cached data so that those regions can be hash-verified after the sleep state is terminated. It may be important to ensure that the hash algorithm is cryptographically strong so that one can be reasonably certain that a hash match provides a suitable guarantee that there has been no alteration of data. In another embodiment, the memory manager 4 may maintain a list of changes to data on a source memory so that the memory manager 4 can determine whether there are any differences between the data on the source memory and corresponding cached data on the auxiliary memory 3, and if so, either discard the cached data or update the data so the cached data reflects changes that have occurred. Of course, it will be understood that another technique that may be used to determine differences between cached data on a removed auxiliary memory 3 and data on a source memory is a comparison of the relevant data to determine whether any differences exist. If differences exist, the cached data may be updated using data from the source memory, the source data may be restored (in the case that the cached data on the removed auxiliary memory 3 is determined to be an appropriate data set for use), or the cached data may be discarded.

Figure 2:
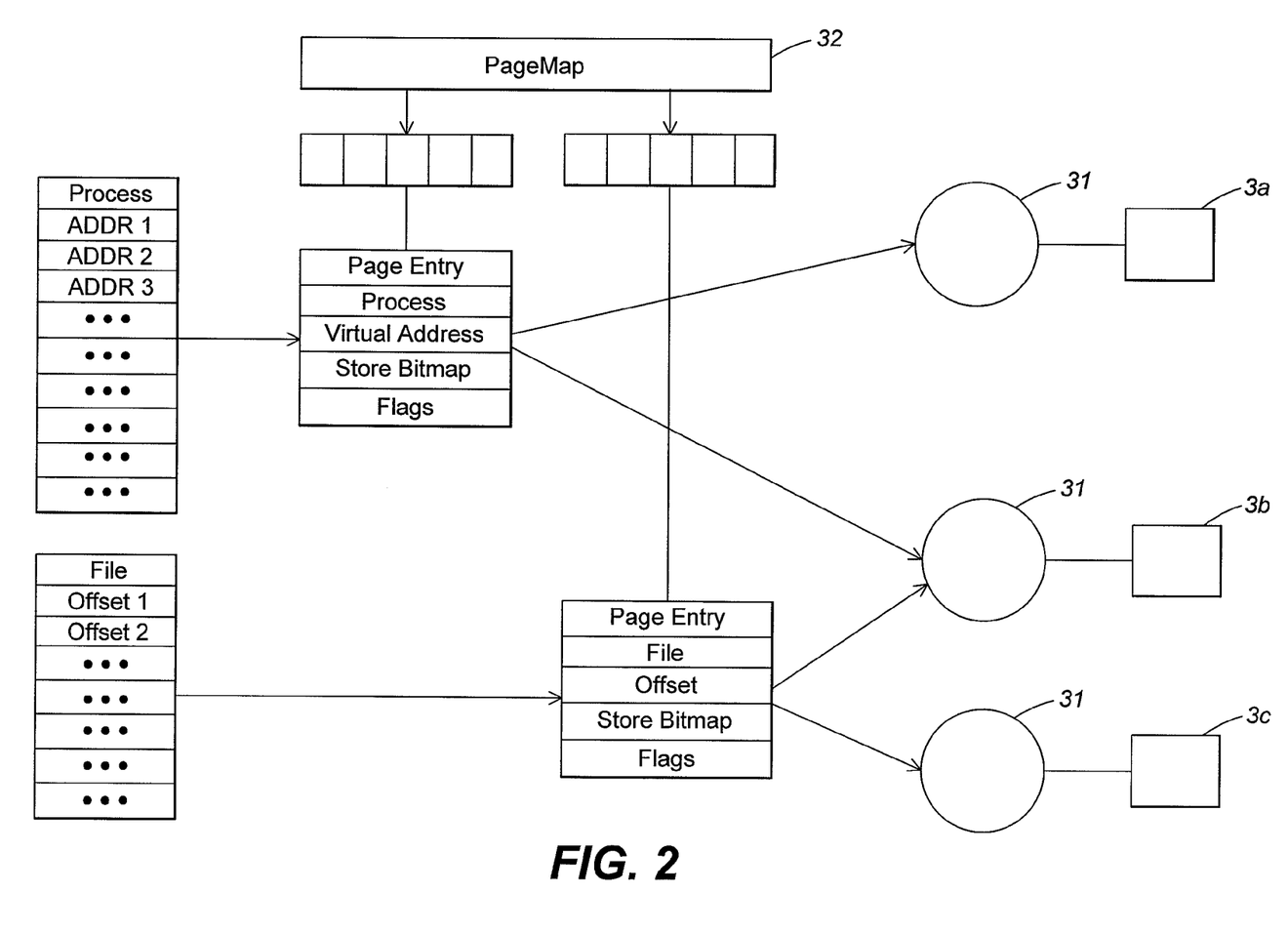
FIG. 2 conceptually illustrates an example of managing virtual cache pages in one embodiment.

In another aspect of the invention, data cached on an auxiliary memory may be cached at a virtual level. For example, the memory manager 4 may identify cached pages by a page key that does not include a physical address for the page on a memory and does not include a physical address for a larger block of data on a memory that includes the page. In one embodiment, pages may be identified by a tuple of the page's file identifier and file offset (e.g., for pages originating from a file) or a tuple of a process using the page and the page's virtual address within the process (e.g., for pages originating from a process). The memory manager 4, which may control the caching of data in a main system memory, may include a cache manager 41 that manages the caching of virtual pages on one or more auxiliary memories 3. (Alternately, the cache manager 41 may be a separate component from the memory manager 4 that interacts with the memory manager 4.) In this embodiment, communication between the memory manager 4 and the cache manager 41 uses page keys to identify pages, and pages may be organized in auxiliary memories 3 in respective stores (i.e., an organizational arrangement for pages and information regarding pages). A policy manager (which may or may not be part of the memory manager 4) may make the decisions regarding which pages are placed in stores 31 on auxiliary memories 3 and when. These decisions may be made based on various factors, including store location, store read/write speed, store size, store removability, page identity, page access history, page compressibility, and others. For example, if the memory manager 4 and/or policy manager determines that caching a set of pages on an auxiliary memory 3 having a read/write speed greater than a disk memory would improve performance of the system, the memory manager 4 may direct the pages expected to be used by the processor 1 be copied to the auxiliary memory 3. In one embodiment shown schematically in FIG. 2, when a page is added to a store 31, the memory manager 4 gives the cache manager 41 the page, its key and optionally a set of stores 31 to which the page is to be added. The cache manager 41 may organize stores 31 in an auxiliary memory 3 into regions, which may have a size of about 32 kB to 1 MB when using a 4 kB-8 kB page size. The cache manager 41 (or alternately a store 31) may maintain information regarding the location of each page in each store 31, e.g., expressed as the tuple of a region number and the region offset in the auxiliary memory 3. This information may be stored in a lookup data structure 32, called a PageMap, which may take the form of a B+tree or hash table. The PageMap 32 may include an entry for each page in the store 31, and be searchable by the associated Page key. As can be seen in FIG. 2, the entry for each page may include the Page key tuple (e.g., file/offset or process/virtual address) as well as the location information (e.g., store bitmap) and one or more flags (e.g., priority information, CRC information, etc.).

When retrieving a page from a store 31 (e.g., so that an application can use the page) or removing a page from a store 31, the memory manager 4 provides the page key to the cache manager 41. In response, the cache manager 41 may search the PageMap 32 for the corresponding Page keys, identify the store(s) 31 and location(s) for the page, and provide the page to the memory manager 4. A retrieved page may be placed in main system by the memory manager 4, e.g., so that an application can access the page. If the page is not present, e.g., because an auxiliary memory 3 having the cached page has been removed, the cache manager 41 may indicate a failed operation to the memory manager 4. The memory manager 4 may then resort to other copies of the page. Modified pages or pages that are to be modified generally are removed from stores 31 on auxiliary memory 3 because those copies on the stores 31 will become out of date. The cache manager 41 may remove pages from a store 31 without any input/output being required with the respective auxiliary memory 3, e.g., by updating the PageMap 32. With this arrangement, the memory manager 4 may maintain a relatively small amount of information regarding pages, e.g., the page key and a "present bit" which indicates whether a page is present in a store or not, since the cache manager 41 may maintain sufficient information regarding page location, etc.

Aspects, including embodiments described above, can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of embodiments in accordance with aspects of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention. It should be appreciated that in accordance with several embodiments of the present invention wherein processes are implemented in a computer readable medium, the computer implemented processes may, during the course of their execution, receive input manually (e.g., from a user).

While aspects of the invention have been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting. Various changes may be made without departing from the invention.

The invention claimed is:

1. A computing device comprising:
a main system memory configured for storing a plurality of pages of data;
at least one auxiliary memory configured for storing the plurality of pages of data and for being removable from the computing device; and
a memory manager configured for controlling the caching of virtual pages of data on the at least one auxiliary memory, the memory manager further configured for identifying a virtual page of the virtual pages using a page key comprising a tuple, the page key configured for identifying the virtual page as cached in a file based on the tuple comprising the virtual page's file identifier and its file offset information, and further configured for identifying the virtual page as employed by a process based on the tuple comprising the virtual page's process identifier and its virtual address within the process, the memory manager further configured for verifying that virtual pages of data cached on the auxiliary memory are consistent with pages of data stored in the main system memory after the auxiliary memory is removed from the computing device and reconnected to the computing device, where the verifying is based on an analysis of non-time stamp virtual page data on the auxiliary memory.

2. The computing device computer system of claim 1, wherein the tuple of the page key comprises the virtual page's originating file identifier and its originating file offset information corresponding to the virtual page being cached in the file, and wherein the tuple of the page key comprises the virtual page's process identifier and its virtual address within the process corresponding to the virtual page being employed by the process.

3. The computing device of claim 1, wherein the at least one auxiliary memory is removable from the computer system without loss of data corresponding to the virtual pages stored on the at least one auxiliary memory.

4. The computing device of claim 3, wherein the at least one auxiliary memory includes a plurality of memories.

5. The computing device of claim 1, wherein virtual pages stored on the removable at least one auxiliary memory are encrypted.

6. The computing device of claim 1, wherein dirty virtual pages are stored on non-removable auxiliary memories, and clean virtual pages are stored on removable or non-removable auxiliary memories.

7. The computing device of claim 1, wherein the virtual pages are stored in compressed form on the at least one auxiliary memory.

8. The computing device of claim 1, wherein a virtual data authenticity indicator is used by the memory manager to verify that a virtual page on an auxiliary memory remains unchanged after communication between the computer system and the auxiliary memory is interrupted.

9. The computing device of claim 8, wherein the virtual data authenticity indicator includes a hash of the virtual page, and interruption of communication between the computing device and the auxiliary memory is caused by power down of the computing device or removal of the auxiliary memory from the computing device.

10. A method performed on a computing device for managing virtual pages cached in auxiliary memory, the method comprising:
   providing a main system memory configured for storing a plurality of pages of data, and the auxiliary memory configured for storing the plurality of pages of data and for being removable from the computing device;
   caching virtual pages of data on the auxiliary memory, a virtual page of the virtual pages being identified by a page key comprising a tuple, the page key configured for identifying the virtual page as cached in a file based on the tuple comprising the virtual page's file identifier and its file offset information, and further configured for identifying the virtual page as employed by a process based on the tuple comprising virtual page's process identifier and its virtual address within the process;
   disconnecting the auxiliary memory from the computing device;
   reconnecting the auxiliary memory to the computing device; and
   verifying that virtual pages cached on the auxiliary memory are consistent with corresponding page data stored in the main system memory, the verifying performed after reconnecting the auxiliary memory to the computing device and based on an analysis of non-time stamp cached virtual page data on the auxiliary memory.

11. The method of claim 10, further comprising caching other virtual pages of data on the auxiliary memory, the virtual pages being identified by a page key that includes a tuple of process and virtual address information.

12. The method of claim 11, further comprising generating a virtual data authenticity indicator used to verify that a virtual page on an auxiliary memory remains unchanged after communication between the computing device and the auxiliary memory is interrupted.

13. The method of claim 10, wherein the disconnecting and the reconnecting are performed without loss of data corresponding to the virtual pages stored on the at least one auxiliary memory.

14. The method of claim 10, wherein virtual pages stored on the auxiliary memory are encrypted.

15. The method of claim 10, wherein the step of caching virtual pages includes:
   caching dirty virtual pages on non-removable auxiliary memory, and
   caching clean virtual pages on removable auxiliary memory.

16. The method of claim 10, wherein the virtual pages are stored in compressed form on the auxiliary memory.

17. The method of claim 10 further comprising:
   first identifying, in response to the virtual page being cached in the file, the virtual page using the page key based on the tuple of the page key comprising the virtual page's originating file identifier and its originating file offset information; or
   second identifying, in response to the virtual page being employed by the process, the virtual page using the page key based on the tuple of the page key comprising the virtual page's process identifier and its virtual address within the process.

18. A method performed on a computing device for managing pages cached in memory, the method comprising:
   providing a main system memory configured for storing a plurality of pages of data, and an auxiliary memory configured for storing the plurality of pages of data and for being removable from the computer system;
   caching virtual pages of data on the auxiliary memory, a virtual page of the virtual pages being identified by a page key comprising a tuple, the page key configured for identifying the virtual page as cached in a file based on the tuple comprising the virtual page's file identifier and file offset information, and further configured for identifying the virtual page as employed by a process based on the tuple comprising the virtual page's process identifier and its virtual address within the process.

19. The method of claim 18 further comprising:
   disconnecting the auxiliary memory from the computing device;
   reconnecting the auxiliary memory to computing device to speed computing device operations; and
   verifying that pages cached on the auxiliary memory are consistent with corresponding page data stored in another memory of the computer system, the verifying performed after reconnecting the auxiliary memory to the computer system and based on an analysis of non-time stamp cached page data on the auxiliary memory, wherein the verifying includes:
     comparing data cached on the auxiliary memory with the corresponding data stored on the source memory of the computer system from which the data was cached; or
     assessing whether an authenticity indicator for the data cached on the auxiliary memory indicates a change in the data; or
     determining whether changes to the data cached on the auxiliary memory have occurred based on a list of changes maintained for the auxiliary memory.

20. The method of claim 18 further comprising:
   first identifying, in response to the virtual page being cached in the file, the virtual page using the page key based on the tuple of the page key comprising the virtual page's originating file identifier and its originating file offset information; and
   second identifying, in response to the virtual page being employed by the process, the virtual page using the page key based on the tuple of the page key comprising the virtual page's process identifier and its virtual address within the process.

* * * * *